United States Patent
Cheang et al.

(10) Patent No.: US 7,719,791 B2
(45) Date of Patent: May 18, 2010

(54) REDUCING A PROBABILITY OF AN ORGANIC RING FORMING ON AN AIR BEARING SURFACE OF A SLIDER WHILE MANUFACTURING THE HEAD STACK ASSEMBLY

(75) Inventors: Weng K. Cheang, Singapore (SG); Yu C. Shen, Singapore (SG); Aik K. Tay, Singapore (SG)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 818 days.

(21) Appl. No.: 11/643,197

(22) Filed: Dec. 20, 2006

(65) Prior Publication Data

US 2008/0151419 A1 Jun. 26, 2008

(51) Int. Cl.
*G11B 33/14* (2006.01)

(52) U.S. Cl. .................................................. 360/97.02

(58) Field of Classification Search ........................ None
See application file for complete search history.

(56) References Cited

U.S. PATENT DOCUMENTS

| | | | | |
|---|---|---|---|---|
| 6,329,023 | B2 * | 12/2001 | Tokisue et al. | 427/489 |
| 6,518,230 | B2 * | 2/2003 | Wu et al. | 510/200 |
| 6,777,642 | B2 * | 8/2004 | Song et al. | 219/121.68 |
| 2003/0146019 | A1 * | 8/2003 | Hirai | 174/257 |
| 2004/0206731 | A1 * | 10/2004 | Song et al. | 219/121.63 |
| 2005/0243469 | A1 * | 11/2005 | Chaw et al. | 360/235.1 |
| 2008/0104861 | A1 * | 5/2008 | Yahiro | 34/463 |
| 2009/0137439 | A1 * | 5/2009 | Dinh et al. | 510/170 |

* cited by examiner

*Primary Examiner*—Mark Blouin

(57) ABSTRACT

Embodiments of the present invention pertain to reducing a probability of an organic ring forming on an air bearing surface of a slider while manufacturing the head stack assembly. According to one embodiment, clean dry air is received. The clean dry air is blown at a location on a suspension for the slider to vaporize at least a portion of a solution that potentially causes the organic ring to form on the air bearing surface of the slider.

20 Claims, 6 Drawing Sheets

REDUCING A PROBABILITY OF AN ORGANIC RING FORMING ON AN AIR BEARING SURFACE OF A SLIDER WHILE MANUFACTURING THE HEAD STACK ASSEMBLY

TECHNICAL FIELD

Embodiments of the present invention relate to manufacturing. More specifically, embodiments of the present invention relate to reducing a probability of an organic ring forming on an air bearing surface of a slider while manufacturing the head stack assembly.

BACKGROUND

Manufacturing disk drives is a very competitive business. People that buy disk drives are demanding more and more for their money. For example, they want disk drives that are more reliable and have more capabilities. One way to provide more capabilities is to make the various disk drive parts smaller and to have the slider glide closer to the disk's surface.

Typically a hard disk drive (HDD) uses an actuator assembly for positioning read/write heads at the desired location of a disk's surface to read data from and/or write data to the disk's surface. The read/write heads can be mounted on what is known as a slider. Generally, a slider provides mechanical support for a read/write head and electrical connections between the head and the drive.

The rotation of a disk around the spindle causes air to move beneath a slider. The slider can glide over the moving air at a uniform distance above the surface of the rotating disk, thus, avoiding contact between the read/write head and the surface of the disk. It is important that the air bearing surface (ABS) of the slider is smooth so that it glides properly.

SUMMARY OF THE INVENTION

Embodiments of the present invention pertain to reducing a probability of an organic ring forming on an air bearing surface of a slider while manufacturing the head stack assembly. According to one embodiment, clean dry air is received. The clean dry air is blown at a location on a suspension for the slider to vaporize at least a portion of a solution that potentially causes the organic ring to form on the air bearing surface of the slider.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

As already stated, it is important that the air bearing surface of a slider is smooth so that it glides properly. Solutions, such as ethanol, are used to lubricate various parts of a hard disk drive. For example, ethanol can be used to lubricate moving parts of the suspension that a slider is attached to. If the ethanol runs and gets onto the slider, one or more organic rings can form on the slider's ABS, thus, reducing the smoothness of the ABS.

According to one embodiment, an apparatus for reducing the probability of an organic ring forming on a slider's ABS while manufacturing the head stack assembly is provided. The apparatus can include a nozzle and a bracket. The nozzle can be used to blow clean dry air that causes ethanol to be vaporized before it reaches the slider's ABS. The bracket can be used for coupling the nozzle to a hard disk drive manufacturing system.

Hard Disk Drive

Figure 1:
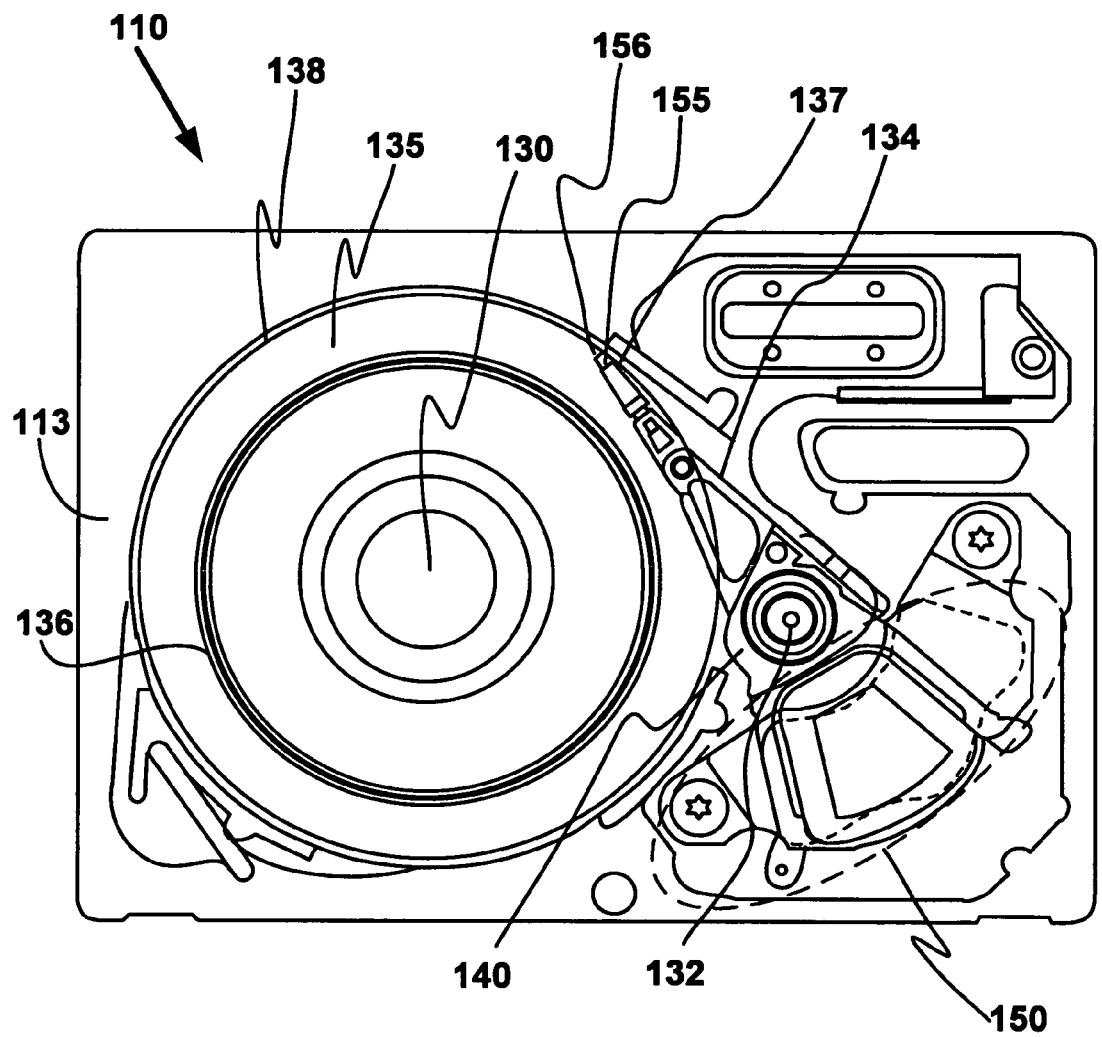
FIG. 1 depicts a plan view of a disk drive for facilitating the discussion of various embodiments of the present invention.

FIG. 1 depicts a plan view of a disk drive for facilitating the discussion of various embodiments of the present invention. The disk drive 110 includes a base casting 113, a motor hub assembly 130, a disk 138, actuator shaft 132, actuator arm 134, suspension assembly 137, a hub 140, voice coil motor 150, a magnetic head 156, and a slider 155.

The components are assembled into a base casting 113, which provides attachment and registration points for components and sub assemblies. A plurality of suspension assemblies 137 (one shown) can be attached to the actuator arms 134 (one shown) in the form of a comb. A suspension assembly 137 is also referred to as a "suspension." A plurality of transducer heads or sliders 155 (one shown) can be attached respectively to the suspension assemblies 137. Sliders 155 are located proximate to the disk 138's surface 135 for reading and writing data with magnetic heads 156 (one shown). The rotary voice coil motor 150 rotates actuator arms 135 about the actuator shaft 132 in order to move the suspension assemblies 150 to the desired radial position on a disk 138. The actuator shaft 132, hub 140, actuator arms 134, and voice coil motor 150 may be referred to collectively as a rotary actuator assembly.

Data is recorded onto the disk's surface 135 in a pattern of concentric rings known as data tracks 136. The disk's surface 135 is spun at high speed by means of a motor-hub assembly 130. Data tracks 136 are recorded onto spinning disk surfaces 135 by means of magnetic heads 156, which typically reside at the end of sliders 155.

FIG. 1 being a plan view shows only one head, slider and disk surface combination. One skilled in the art understands that what is described for one head-disk combination applies to multiple head-disk combinations, such as disk stacks (not shown). However, for purposes of brevity and clarity, FIG. 10 only shows one head and one disk surface.

Combs

Figure 2:
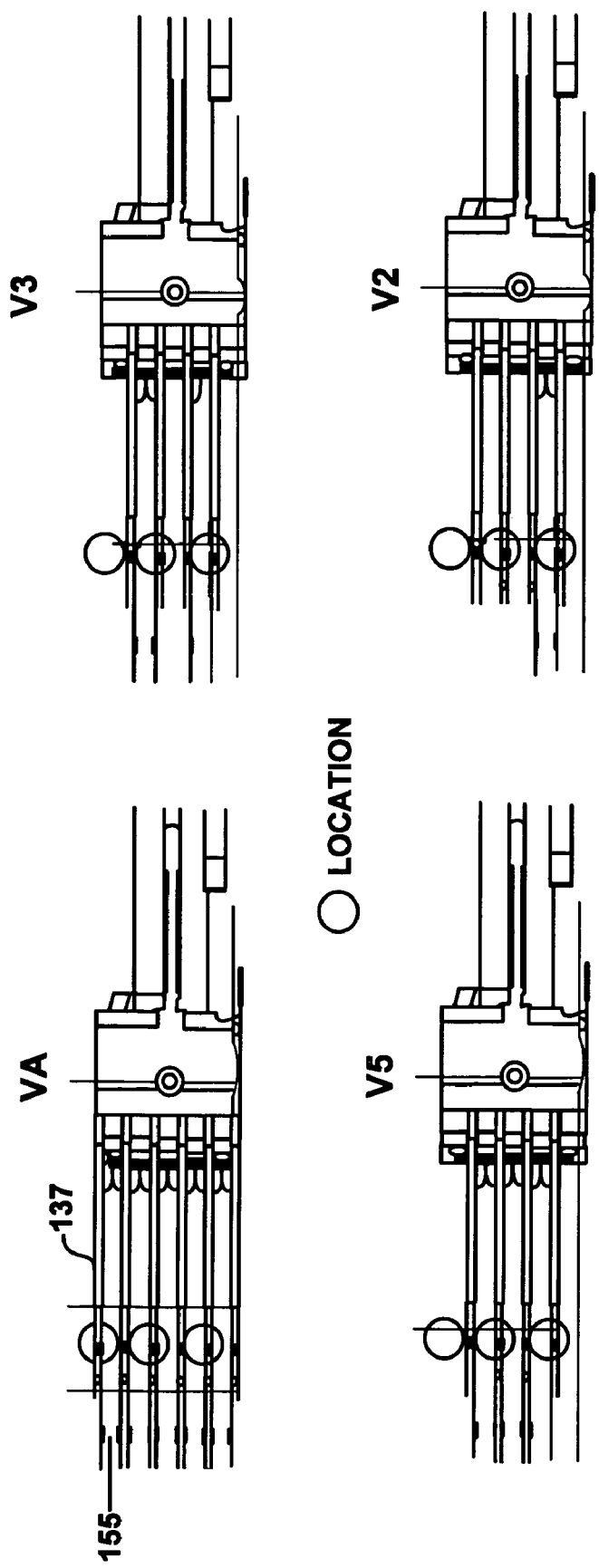
FIG. 2 depicts several models of combs that can be used in hard disk drives with multiple head-disk combinations, according to one embodiment.

FIG. 2 depicts several models of combs that can be used in hard disk drives with multiple head-disk combinations, according to one embodiment. What is commonly known as a "comb" includes multiple suspension assemblies 137 and sliders 155, among other things. The VA model has 6 suspension assemblies 137 and 10 sliders 155. Models V2, V3 and V5 show other variations of suspension assemblies 137 and sliders 155. The VA model is a full-pop comb and models V2, V3 and V5 are de-pop combs. According to one embodiment, clean dry air is blown in close proximity to the swage holes associated with the suspension assemblies 137. As depicted in FIG. 2, circles are used to depict the locations that clean dry air is blown on, according to one embodiment.

Figure 3:
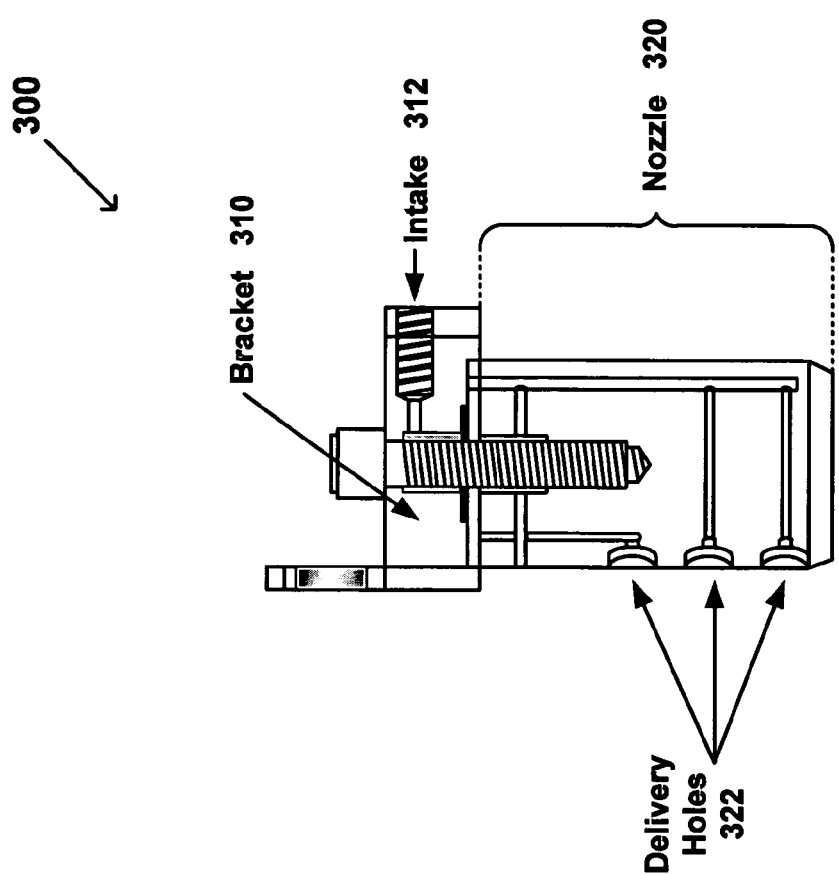
FIG. 3 depicts an apparatus for reducing the probability of an organic ring forming on a slider's ABS while manufacturing the head stack assembly, according to one embodiment.

An Apparatus for Reducing a Probability of an Organic Ring Forming on an Air Bearing Surface of a Slider FIG. 3 depicts an apparatus for reducing the probability of an organic ring forming on a slider's ABS while manufacturing the head stack assembly, according to one embodiment. As depicted in FIG. 3, the apparatus 300 can include a nozzle 320 and a bracket 310. As depicted in FIG. 3, the bracket 310 is an L-bracket. The nozzle 320 can be coupled to the bracket 310 and the bracket 310 can be used for coupling the apparatus 300 to a hard disk drive manufacturing system.

The bracket 310 has an intake 312 for receiving clean dry air, for example, from the manufacturing site's clean dry air supply system. The nozzle 320 can include one or more delivery holes 322 for blowing the clean dry air out of. The received clean dry air can travel through passages associated with the bracket 310 and the nozzle 320 and out one or more of the delivery holes 322. As depicted in FIG. 3, the apparatus 300 has 3 delivery holes. The clean dry air can be blown at one or more locations, as indicated by the circles on FIG. 2, on the suspension 137 that the slider 155 is coupled to. The clean dry air blown from the delivery holes can be blown at respective locations. For example, as depicted in FIG. 2 there are 3 locations and as depicted in FIG. 3 there are 3 delivery holes. Each delivery can blow clean dry air to a respective location. The clean dry air that is blown on the locations vaporizes at least a portion of the solution to reduce the probability that an organic ring will form on the slider 155's ABS. According to one embodiment, the clean dry air is blown at approximately 0.2 to 0.25 pascals. The clean dry air from the manufacturing site's clean air supply system may have passed through an extra filter besides what is provided by the manufacturing site's clean air supply system.

Figure 4:
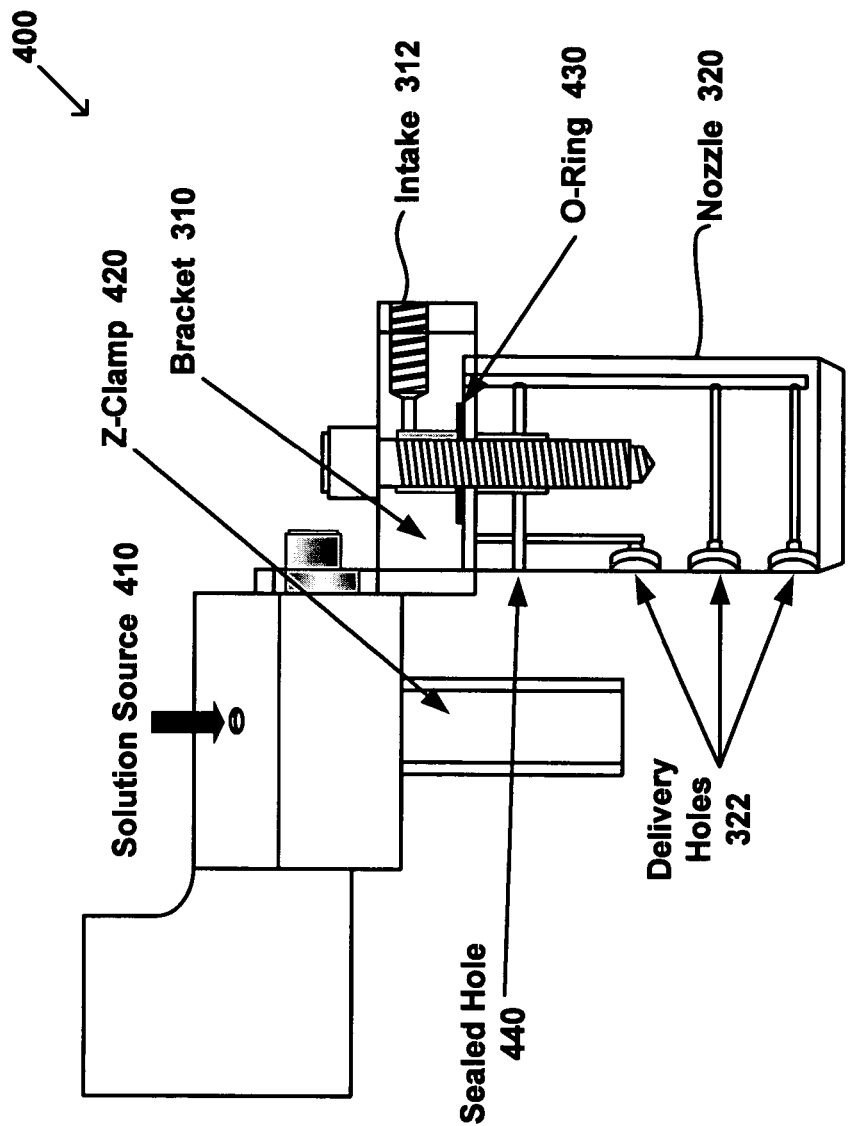
FIG. 4 depicts an apparatus for reducing the probability of an organic ring forming on a slider's ABS while manufacturing the head stack assembly, according to one embodiment.

FIG. 4 depicts an apparatus 400 for reducing the probability of an organic ring forming on a slider's ABS while manufacturing the head stack assembly, according to one embodiment. As depicted in FIG. 4, the apparatus 400 is attached to a manufacturing system's z-clamp 420. The z-clamp 420 can be used to adjust the height of an apparatus 400. An O-ring 430 can be used as a part of coupling the nozzle 320 to the bracket 310.

Although only one bolt for attaching the bracket 310 to the Z-clamp 420 can be seen in the side view depicted in FIG. 4, more than one bolt can be used, as will become more evident. For example, two bolts may be used to attach the bracket 310 to the z-clamp 420. The solution that causes organic rings may originate from the hole pointed to by solution source 410, which is also commonly known as "swage lube." According to one embodiment, the apparatus 400 has one or more sealed holes 440.

Figure 5:
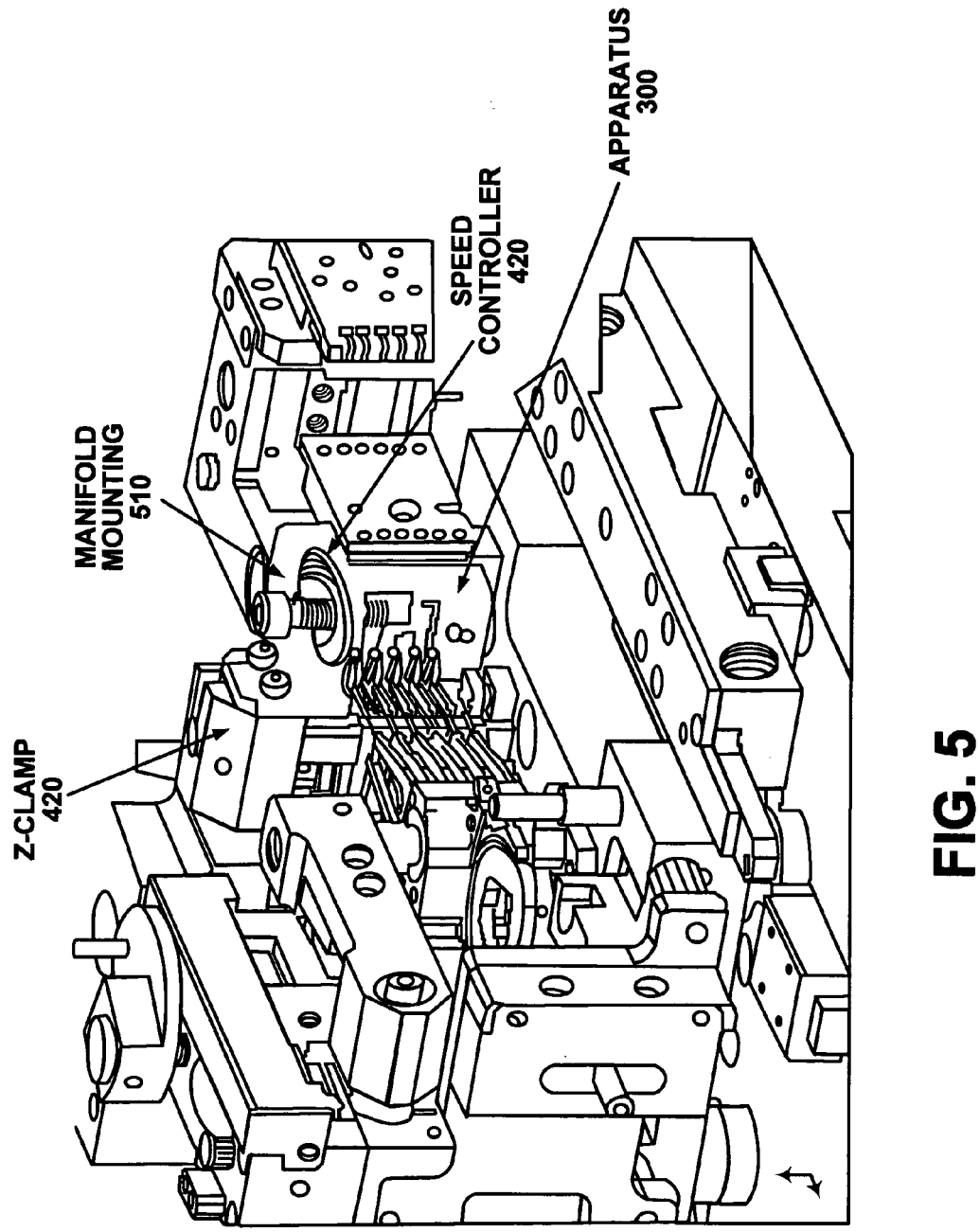
FIG. 5 depicts an apparatus for reducing the probability of an organic ring forming on a slider's ABS while manufacturing the head stack assembly with respect to a part of a system 500 for manufacturing hard disk drives, according to one embodiment.

FIG. 5 depicts an apparatus 300 for reducing the probability of an organic ring forming on a slider's ABS while manufacturing the head stack assembly with respect to a part of a system 500 for manufacturing hard disk drives, according to one embodiment. FIG. 5 depicts an apparatus 300 that is attached to the Z-clamp 420 and the relative position of suspensions. As depicted in FIG. 5, two bolts are used to attack the apparatus' bracket 310 to the Z-clamp 420. The apparatus 300 as depicted in FIG. 5 is in close proximity to a manifold mounting 510 and a speed controller 520.

Figure 6:
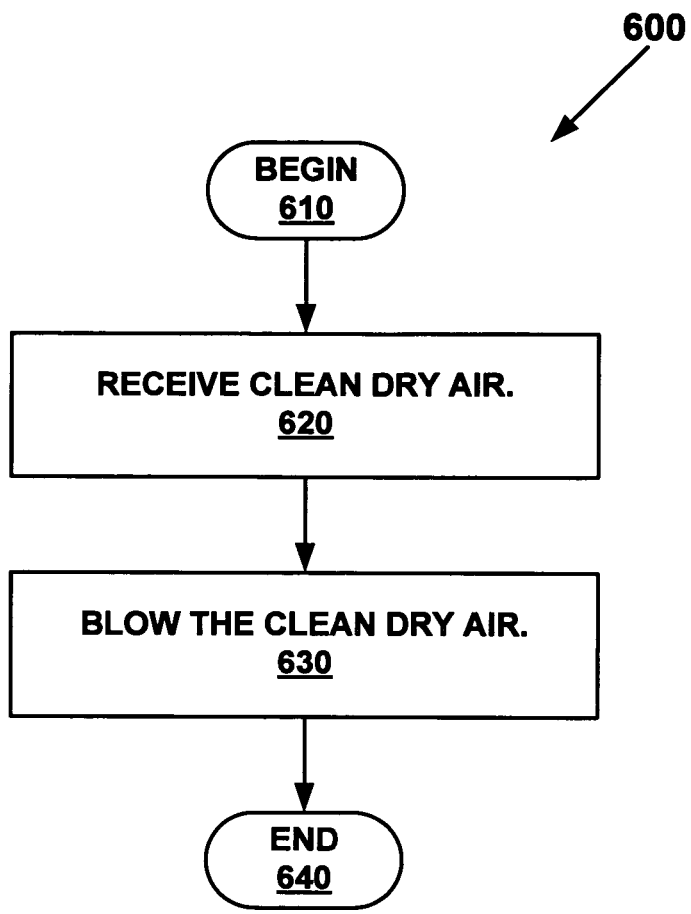
FIG. 6 depicts a flowchart describing a method for reducing a probability of an organic ring forming on an air bearing surface of a slider while manufacturing the head stack assembly, according to various embodiments of the present invention.

Method for Reducing a Probability of an Organic Ring Forming On an Air Bearing Surface of a Slider while Manufacturing the Head Stack Assembly FIG. 6 depicts a flowchart 600 describing a method for reducing a probability of an organic ring forming on an air bearing surface of a slider while manufacturing the head stack assembly, according to various embodiments of the present invention. Although specific steps are disclosed in flowchart 600, such steps are exemplary. That is, embodiments of the present invention are well suited to performing various other steps or variations of the steps recited in flowchart 600. It is appreciated that the steps in flowchart 600 may be performed in an order different than presented, and that not all of the steps in flowchart 600 may be performed.

At step 610, the method begins

At step 620, clean dry air is received. For example, referring to FIG. 3, the apparatus 300's intake 312 can receive the clean dry air from the manufacturing site's clean dry air supply system. The clean dry air from the manufacturing site's clean dry air supply system may have passed through an extra filter besides what is provided by the manufacturing site's clean dry air supply system.

At step 630, the clean dry air is blown at a location on a suspension of the slider to vaporize at least a portion of a solution that potentially causes an organic ring to form on the air bearing surface of the slider. The received clean dry air can travel through the apparatus 300's nozzle 320 and out three delivery holes 322. The delivery holes 322 can be positioned so that the clean dry air is blown at locations on a suspension 137 of a slider 155 to vaporize at least a portion of a solution, such as ethanol, that can potentially cause one or more organic rings to form on the air bearing surface of the slider 155. For example, referring to FIG. 2, the clean dry air can be blown in close proximity to the locations that are indicated by the circles. According to one embodiment, the location or locations that the clean dry air is blown on is in close proximity to one or more swage holes associated with the suspension 137. The z-clamp 420 can be used to adjust the height of the apparatus 300 so that the clean dry air is blown in close proximity to the swage holes.

At step 640, the method ends.

The method described by flowchart 600 reduces the probability that one or more organic rings will be formed. Even in the event that an organic ring does form, the number of organic rings will be fewer than if the method described by flowchart 600 were not used. The sliders can be washed after the method described by flowchart 600 is performed. Washing the sliders may remove the few organic rings in the event that any were formed.

What is claimed is:

1. A method of reducing a probability of an organic ring forming on an air bearing surface of a slider while manufacturing the head stack assembly, the method comprising:
   receiving clean dry air; and
   blowing the clean dry air at a location on a suspension for the slider to vaporize at least a portion of a solution that potentially causes the organic ring to form on the air bearing surface of the slider.

2. The method as recited by claim 1, wherein the blowing of the clean dry air at the location on the suspension of the slider to vaporize at least the portion of the solution further comprises:
   blowing the clean dry air at the location on the suspension for the slider to vaporize at least a portion of ethanol.

3. The method as recited by claim 1, wherein the blowing of the clean dry air at the location on the suspension of the slider to vaporize at least the portion of the solution further comprises:
   blowing the clean dry air at a pressure that ranges from approximately 0.2 pascals to approximately 0.25 pascals.

4. The method as recited by claim 1, wherein the blowing of the clean dry air at the location on the suspension of the slider to vaporize at least the portion of the solution further comprises:
   blowing the clean dry air at a location that is in close proximity of a swage hole associated with the suspension.

5. The method as recited by claim 1, further comprising:
   washing the slider after the clean dry air was blown at the location on the suspension.

6. The method as recited by claim 1, further comprising:
   adjusting a height of an apparatus that performs the receiving of the clean dry air and the blowing of the clean dry air so that the clean dry air is blown at the location.

7. The method as recited by claim 1, wherein the receiving of the clean dry air further comprises:
   receiving the clean dry air from a manufacturing site's clean dry air supply system.

8. An apparatus for reducing a probability of an organic ring forming on an air bearing surface of a slider while manufacturing the head stack assembly, the apparatus comprising:
   a nozzle for blowing clean dry air at a location on a suspension for the slider to vaporize at least a portion of a solution that potentially causes the organic ring to form on the air bearing surface of the slider; and
   a bracket for coupling the apparatus to a hard disk drive manufacturing system, wherein the nozzle is coupled to the bracket.

9. The apparatus of claim 8, wherein the solution is ethanol.

10. The apparatus of claim 8, wherein the bracket is an L-bracket.

11. The apparatus of claim 8, wherein the nozzle includes a plurality of delivery holes for blowing the clean dry air at the location.

12. The apparatus of claim 11, wherein there are three delivery holes.

13. The apparatus of claim 8, wherein the apparatus is attached a z-clamp associated with a disk drive manufacturing system.

14. The apparatus of claim 8, wherein the clean dry air is blown at a pressure that ranges from approximately 0.2 pascals to approximately 0.25 pascals.

15. A hard disk drive that was manufactured using an apparatus for reducing a probability of an organic ring forming on an air bearing surface of a slider while manufacturing the hard disk drive, the hard disk drive comprising:
   a suspension for the slider, wherein clean dry air was blown onto a location of the suspension to vaporize at least a portion of a solution while the hard disk drive was being manufactured; and
   a slider that is suspended by the suspension, wherein the vaporization of at least the portion of the solution reduced the probability that the organic ring would form on the air bearing surface of the slider.

16. The hard disk drive of claim 15, wherein the location is in close proximity to a swage hole associated with the suspension.

17. The hard disk drive of claim 15, wherein the solution is used to lubricate one or more parts of the hard disk drive.

18. The hard disk drive of claim 15, wherein the clean dry air is blown at a pressure that ranges from approximately 0.2 pascals to approximately 0.25 pascals.

19. The hard disk drive of claim 15, wherein the apparatus includes a bracket for coupling the apparatus to a system for manufacturing the hard disk drive.

20. The hard disk drive of claim 15, wherein the apparatus includes a nozzle with one or more delivery holes for blowing the clean dry air onto one or more locations of the suspension.

* * * * *